UNITED STATES PATENT OFFICE.

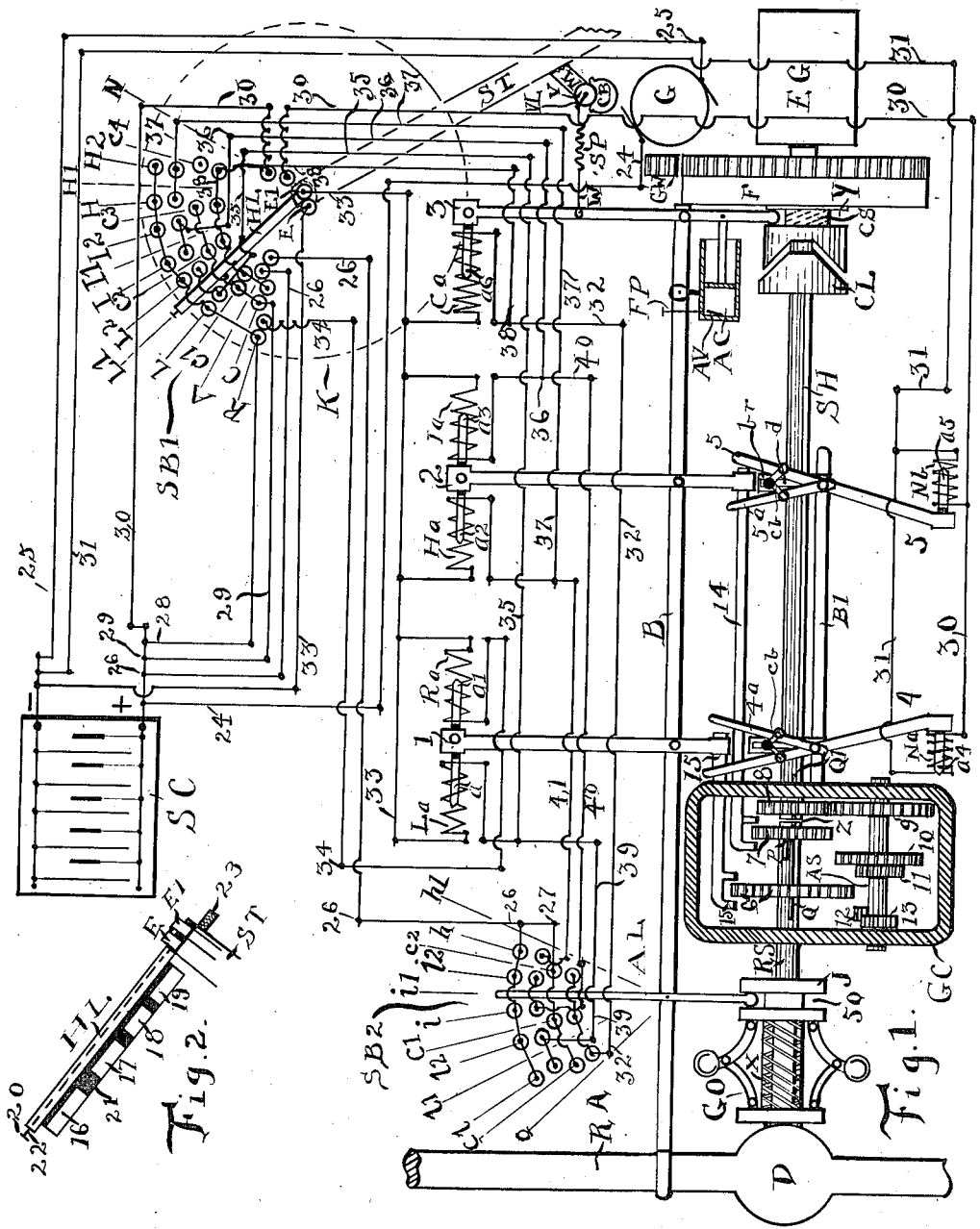

HERBERT S. DILLON AND MYER C. GASS, OF SAN FRANCISCO, CALIFORNIA.

POWER-TRANSMITTING MECHANISM.

1,191,290. Specification of Letters Patent. Patented July 18, 1916.

Application filed April 10, 1913. Serial No. 760,165.

*To all whom it may concern:*

Be it known that we, HERBERT S. DILLON and MYER C. GASS, both of us being residents of the city and county of San Francisco, State of California, as joint inventors have invented certain new and useful Improvements in Power-Transmitting Mechanism, of which the following is a specification.

The invention relates to automobile mechanism and particularly to means for shifting the driving gears and for engaging and disengaging the clutch for said automobile.

One object of the invention is to provide an automobile mechanism in which the gears and clutch are shifted by electromagnetic means included in electric circuits with a source of electric energy, said means being either automatically or manually operative.

A further object of the invention is to provide in an automobile a means of retarding the speed of the engine when the transmission is disconnected.

The invention possesses other advantageous features, which with the foregoing, will be set forth at length in the following description, where we shall outline in full that form of the invention which we have selected for illustration in the drawings accompanying and forming part of the present specification.

The novelty of the invention will be included in the claims succeeding said description. From this it will be apparent that we do not limit ourselves to the showing made by said drawings and description, as we may adopt many variations within the scope of our invention as set forth in said claims.

Referring to said drawings: Figure 1 is a diagrammatic view of our invention as applied to an automobile. Fig. 2 is a side view of the manually operative switch lever located at the steering wheel.

In Fig. 1, the shaft SH is hereinafter designated the driving shaft, the shaft AS the auxiliary shaft, the shaft RS the rear shaft. These terms are used to discriminate between the various shafts shown on the drawing. These shafts together with the speed change gears form the means for transmitting power from the engine EG to the rear axle RA. The driving shaft SH is the shaft leading from the clutch to the speed change gears in the gear case GC.

The auxiliary shaft AS is the short shaft located within the gear case GC. Upon this auxiliary shaft is located part of the speed change gears 9, 10, 11, and 13. The auxiliary shaft AS is used to transmit power from the driving shaft SH to the rear shaft RS by means of the speed change gears 6, 7, 8, 9, 10, 11, 12, and 13 as shown. The rear shaft RS is located between the driving shaft SH and the differential gears located in the differential gear case D. The purpose of the rear shaft RS is for transmitting power from the driving shaft SH to the differential gears in the differential gear case D either directly or by means of the speed change gears as will be hereinafter explained. The gear wheels 6, 7, 8, 9, 10, 11, 12, and 13, in Fig. 1, which are shown to revolve around the various shafts and within the gear case GC are hereinafter called speed change gears, their purpose being to change the ratio of speed from one shaft to another substantially as shown.

The rear shaft RS meets up to the driving shaft SH at the point Z in the gear case GC. The shaft AS is an auxiliary shaft driven by the gear wheels 8 and 9 which are always in mesh, the said shaft AS driving the rear shaft RS by means of the gear wheels 6 or 7 being thrown in mesh with the gear wheels 12, 11, and 10 respectively. The gear wheel 7 may be advanced to the point Z thereby turning the shaft RS with the shaft SH, the gear wheel 7 to receive the keys Q and $Q^1$ which lock the gear wheels relative to the revolving shafts. When the gear wheel 7 is in this position the car is running on direct drive and is in high gear and will be so called in this specification. When the gear wheel 7 is in mesh with the gear wheel 10, the car is in intermediate gear and will be so called. When the gear wheel 6 is in mesh with the gear wheel 11 the car is in low gear and will be so called. When the gear wheel 6 is in mesh with the gear wheel 12, which is below the gear wheel 13 and is in mesh with it, the car is in reverse gear and will be so called.

The centrifugal governor GO is located on the rear shaft RS, forward of the differential gear case D which is in turn midway of the rear axle RA. The lever HL and the lever AL have contact plates on their nether surfaces as shown in Fig. 2, and insulated by the insulation 21 as shown. One end of the lever AL is slidably engaged in the slot 50 of the governor drum J which is slidable along the shaft RS against the action of the spring X. The lever AL is fastened to the brace B and has its other end in slidable contact with switches placed in predetermined positions on the automatic switchboard $SB^2$.

The switchboard $SB^1$ is located at the steering wheel and has a manually operative contact lever HL. In the detail drawing, the contact plates 16, 17, 18, and 19 are electrically insulated from the lever and from each other. The contact E comes in direct contact with the contact cylinder $E^1$ and revolves about the cylinder $E^1$ upon turning the lever HL. The rod 22 in Fig. 2 has a thumb button 20 and extends through the lever handle HL and is adapted to thrust the cylinder contact plates $E^1$ against the action of the spring 23 breaking the electrical connection with the contact plate E.

The levers 1, 2, and 3 are connected with the brace B and have at one end cylindrical cores of metal indicated at $a$, $a^1$, $a^2$, $a^3$, and $a^6$, said cores acting as armatures for the solenoids $La$, $Ra$, $Ha$, $Ia$, and $Ca$ respectively, and being insulated from the respective levers, the opposite end of the lever 1 being connected to the sliding bar 15 and being adapted to slide the wheel 6 along the shaft RS. The opposite end of the lever 2 is likewise in control of the gear wheel 7 by means of the sliding bar 14. The lever 3 has one end slidably engaged in the slot Y of the clutch CL and is adapted to open the clutch, the said clutch closing itself by means of an internal spring CS.

The carbureter CB has the valve V acting between the carbureter and the intake manifold M. The wire W has one end attached to the lever 3, the other end being attached to the valve lever VL on the carbureter CB, the spring SP being an integral part of the wire W. When the lever 3 is pulled by the solenoid $Ca$, the wire W exerts a pull on the carbureter valve V allowing less gas to flow up the intake manifold M thereby retarding the speed of the engine EG when the clutch CL is out or disconnected.

The air compression cylinder AC is attached to the brace B and has its piston attached to the lever 3. When the solenoid $Ca$ loses its electromagnetic force, the spring CS tends to close the clutch instantaneously, but the air in the air compression cylinder AC being under compression at this juncture, compels the clutch to slip slowly into place. The foot lever FP actuates the valve AV in the air compression cylinder AC so that, if in the intermediate or high gear, it is desirable to close the clutch quickly, the foot lever FP may be pressed down thereby allowing the air to rush out of the air compression cylinder AC so that there will be no retarding of the clutch, the slow action being desirable on low gear only.

The levers 4 and 5 have, attached to their ends, the cylindrical bars of metal $a^4$ and $a^5$ which act as armatures for the solenoids $Na$ and $Nb$ respectively, and are electrically insulated from the respective levers, the levers $4^a$ and $5^a$ being attached to the brace $B^1$ and having their opposite ends adjacent to and operative upon the levers 4 and 5 respectively. The levers $4^a$ and $5^a$ work in conjunction with the levers 4 and 5 and exert the same pull inwardly by means of the compass bars $cb$ $cb$ sliding in a groove $d$ which lies longitudinally in the bar $br$, the latter being rigidly attached to the brace $B^1$, this mechanical action being the means of closing the levers $4^a$ and 4, also $5^a$ and 5 respectively.

The cogwheel GW is in mesh with cogs on the fly wheel F, driving the generator G, also driving the fly wheel F when the generator acts as a motor. The generator G has its terminals electrically connected to the terminals of the storage battery SC and is adapted to charge the battery when the engine has attained a predetermined speed and also to act as a motor for the purpose of starting the engine EG.

The electric circuits comprise a storage battery or storage cells SC wired to a plurality of switches distributed over two switch boards, contact plates on the controlling levers HL and AL, and a plurality of electromagnets or solenoids having, as armatures, cylinders of metal attached to the lever arms 1, 2, 3, 4, and 5.

When the manually operative lever HL is over the switch A, the switch is closed. The current, leaving the positive pole of the battery SC, passes along the circuit 26, thence through the switch A, thence by way of circuit 26 to the switches $h$, $i^2$, $i$, $l^2$, and $l$ on the switchboard $SB^2$. The same circuit is also connected to the circuit 27 and thence to the switches $c^2$, $c^1$, and $c$ on the switch board $SB^2$. When the automatic lever AL is on either switch $c^2$, $c^1$ or $c$, the current passes by way of the circuit 32 to the solenoid $Ca$ which exerts a pull on the armature $a^6$ attached to the lever 3 thereby opening the clutch CL. When the automatic lever AL is on the switch $l^2$—$l$, the said switch is closed by means of the contact plate on the lever AL which is similar to the contact plate 16 in Fig. 2. The current passes through the switch $l^2$—$l$ and by way of circuit 39 to the solenoid $La$ which exerts a pull on the armature $a$ attached to the lever 1, sliding the gear wheel 6 in mesh with the gear wheel 11, the car being at this point in low gear. When the shaft RS is not turning, the automatic lever arm AL lies normally in the position indicated at $o$. Then as the lever AL advances to c, the clutch is thrown out by the action of the current as mentioned. The contact switch c being closely in the same radius with the switch $l$, the lever AL will span the two sets of switches c and $l$, the clutch is still out when the lever AL touches the switch $l$ and the gears are changed to low gear as mentioned above. There being no switch at the middle point $l^1$ in the automatic switch board $SB^2$, the solenoid La is released for lack of current, since it is not necessary to maintain a pressure upon the lever 1 after the car is thrown into low gear. Reading from the left to the right on the switchboard $SB^2$, the lever AL, upon the pull of the centrifugal governor GO, passes the switch $c^1$, throwing out the clutch, then reaching the switch $i$, the current passing through the switch $i$ and the solenoid Ia by means of the circuit 40, the solenoid Ia exerting a pull upon the lever 2 throwing the gear wheel 7 in mesh with the gear wheel 10, the car at this point being in intermediate gear. It is necessary for the gear wheel 6 to be out of mesh with the gear wheel 11 and for this purpose the pin $p$ is attached to the wheel 7 and, as the wheel 7 advances toward the wheel 6, the pin $p$ pushes the wheel 6 aside. The middle position $i^1$ on the switchboard $SB^2$ is a resting point for the lever arm AL so that at this point there is no current flowing from the battery SC. Upon the lever arm AL reaching the position $c^2$, the clutch is again thrown out, the lever arm AL then passes to the switch $h$ and makes the electric connection in said switch and passes through the solenoid Ha by means of the circuit 41. The solenoid Ha exerts a pull upon its armature $a^2$, attached to the lever arm 2, pulling the gear wheel 7 over the joint in the shafts at the position marked Z in the gear case GC, the car at this point being on high gear. The current leaving the solenoids La, Ra, Ha, Ia and Ca, returns by means of the circuit 33 and the switch E—$E^1$ to the battery. When the lever arm AL reaches the point $h^1$, the solenoid Ha is released but the gear wheel 7 is still at the point Z and the car is still on high gear. When the shaft RS is slacking its speed, the governor GO thrusts against the lever AL, which, in turn passes back over the contact points of the switches. As the lever AL returns toward its normal position at o, it passes the positions marked $c^2$, $c^1$, and c immediately before closing the respective switches $i^2$—$i$ and $l^2$—$l$, thus throwing out the clutch before changing back into each of the respective gears. Since it is desirable to throw out the clutch and still holding it out, to change the gears, the clutch switches are placed in a radius very nearly coinciding with the radius of the gear switches so as to admit of the lever arm AL closing two sets of switches at the same time.

When the manually operative lever HL is removed from the switch A on the switchboard $SB^1$, the electric circuit 26 is broken and the entire switchboard $SB^2$ electrically disconnected. When the lever arm HL is turned to the left to the switch C, the current passes through the contact plate 17 on the lever arm HL and the current passes to the solenoid Ca on the circuit 29, through the switch C, and circuit 38, the clutch is then disengaged. A similar action takes place when the lever arm HL is in any position $C^1$, $C^2$, $C^3$, or $C^4$ on the switchboard $SB^1$, the current returning to the battery on the circuit 33. When the lever HL is placed on the switch R, the switch is closed by the contact plate 16 in the lever arm HL as shown in the detail Fig. 2, the current flowing by way of the circuit 28, the switch R, and the circuit 34 to the solenoid Ra and thence on circuit 33 back to the battery SC. The solenoid Ra exerts a pull upon its armature $a^1$ attached to the lever 1, sliding the gear wheel 6 into mesh with the small gear wheel 12, the car being in reverse gear at this point. When the contact lever arm HL is advanced to switch L, it passes over the switch $C^1$ throwing out the clutch, then closing the switch L. The current passes by the circuit 28, through the switch L, the circuit 35 and the solenoid La throwing in the low gear.

When the contact lever arm HL is placed over the switch I, the switch is closed by the contact plate 16 in the lever arm HL, the current passing on the circuit 28, through the switch I, and the circuit 36 to the solenoid Ia throwing the car into intermediate gear. When the lever arm HL is over the switch H, the current passes on the circuit 28, the switch H, and the circuit 37 to the solenoid Ha, throwing the automobile into high gear. When the lever arm HL is over the switch N, the switch is closed and the current passes on the circuit 30, through the switch N closed by the contact plate 19 on the lever arm HL, thence on the circuit 30 to the solenoids Na and Nb, said solenoids exerting a pull upon their armatures $a^4$ and $a^5$ attached to the respective levers 4 and 5. The other ends of the levers 4 and 5 working in conjunction with their companion levers $4^a$ and $5^a$ respectively, exert a centering force on the levers 1 and 2 which slides the gear wheels 6 and 7 along the shaft RS into a free position as shown in the drawing, the gears being at this point in neutral position. Since it is desirable to operate the neutral levers without regard to the position of the gears, the neutral gear control current is returned to the battery on the separate circuit 31. It also being desirable to throw the solenoids, which are in control of the gears and clutch, out of electric circuit, their return current is passed through the switch E—E¹, said switch being adapted to be disconnected by a thrust of the rod 22, Fig. 2, which has a thumb button 20 and passes through the lever arm HL. When the rod 22 is thrust against the contact cylinder E¹, it forces it apart from the contact E thereby electrically breaking the return circuit from the solenoids La, Ra, Ha, Ia, and Ca and making them inoperative.

When the switch contact lever HL is on the switch A and the automobile is in motion, the gears are automatically changing positions by means of the electric energy passing through the switches on the switchboard SB² and taking effect on the electromagnetic mechanism as mentioned in the foregoing specification. When the contact lever arm HL is moved from the switch A, the automatic switchboard SB² is disconnected from the source of energy and the gears are manipulative by means of the manually operative switchboard SB¹. To start the car on low gear, the contact lever HL is advanced to the switch C¹, throwing out the clutch, thence to the switch L, sliding the low gears into mesh, then, as the contact lever arm HL leaves the switch C¹, the clutch is forced to close by the spring CS but the engagement of the clutch is retarded by the air compression cylinder AC as hereinbefore mentioned. It being desirable to retard the speed of the engine a trifle, the clutch lever 3 exerts a pull upon the carbureter valve V by means of the wire W and valve lever VL, causing less gas to flow up the intake manifold M. The force of the clutch is gradually applied, as mentioned, and the automobile is running on low gear. The current may then be switched to the automatic switchboard SB² upon pressing the button 20 in the lever arm HL thereby disconnecting all energy by means of the return circuit switch E—E¹. The lever arm HL may then be placed back upon the switch A and the automobile will be changing gears automatically.

When the car is being driven by means of the manually operative switchboard SB¹ on high gear and it is desirable to throw all the gear and clutch shifting mechanism out of circuit, the lever arm HL may be shifted over the switch C⁴, thus disengaging the clutch, and thence to the switch N, throwing the gears into neutral position. The lever HL then being advanced beyond the switch C⁴, allows the clutch to again be applied and the automobile is coasting with the gears in neutral position and the clutch applied, but there is no driving motion from the shaft SH to the shaft RS because their connection is not made at the point Z.

When the automobile is not in motion, the lever HL may rest upon the switch A. Then since the lever arm AL, on the switchboard SB², is normally standing in the position indicated at o, there is no closed circuit through which the current may flow.

The manipulation of the speed change gears by means of electric current and a source of electric energy is not claimed as new in the following claims.

What we desire to claim as new in this application is a centrifugal governor located on the rear shaft in combination with operating electric circuits for the purpose of deflecting electric energy from one circuit to another, thereby controlling the action of the gear shifting devices, and means for shunting the electric circuits connected with the centrifugal governor so that the governor becomes ineffective.

We claim:

1. In an automobile, the combination of a driving shaft, a driving element, a rear shaft, means for transmitting power from the driving shaft to the rear shaft, an auxiliary shaft, means for transmitting power from the driving shaft to the auxiliary shaft, a plurality of speed change gears located on the auxiliary shaft and rear shaft for transmitting power from the auxiliary shaft to the rear shaft, a clutch for transmitting power from the driving element to the driving shaft, means for shifting the gears and clutch comprising a source of electric energy, a plurality of electro-magnets operative by said source, means for operating two or more of the electro-magnets in synchronism, means operative by the said electro-magnets for changing the relative positions of the gears, and means operative by at least one of the electro-magnets for disengaging the clutch.

2. In an automobile, the combination of a driving shaft, a driving element, a clutch for transmitting power from the driving element to the driving shaft, an auxiliary shaft, a rear shaft, means for transmitting power from the driving shaft to the rear shaft, means for transmitting power from the driving shaft to the auxiliary shaft, speed change gears located on the auxiliary shaft and rear shaft for transmitting power from the auxiliary shaft to the rear shaft, a source of electric energy, a plurality of electric circuits having their terminals connected with said source, electro-magnetically operative means for changing the relative position of the gears and for disengaging the clutch, an automatically operative switchboard, a manually operative switchboard, a plurality of electric switches included in the electric circuits and being located at predetermined points on said switchboards, means for deflecting the electric energy from at least one of the said circuits on the manually operative switchboard to at least one of the circuits on the automatically operative switchboard, means located on the manually operative switchboard for shunting the electric energy from the automatically operative switchboard, means for operating the electric circuits separately, and means for operating at least two of the electric circuits in unison.

3. In an automobile, the combination of a driving shaft, a driving element, an auxiliary shaft, a rear shaft, a clutch for transmitting power from the driving element to the driving shaft, means for transmitting power from the driving shaft to the rear shaft, means for transmitting power from the driving shaft to the auxiliary shaft, speed change gears located on the auxiliary shaft and rear shaft for transmitting power from the auxiliary shaft to the rear shaft, a series of operating electric circuits, a source of electric energy, a plurality of electro-magnets included in said circuits, means for operating said gears and clutch by said electro-magnets, a centrifugal governor connected to the rear shaft, a lever actuated by the centrifugal governor, means for opening and closing a plurality of said operating electric circuits, said means being actuated by said lever.

4. A power transmitting mechanism for automobiles comprising a driving shaft, a driving element, a clutch for transmitting power from the driving element to the driving shaft, an auxiliary shaft, means for transmitting power from the driving shaft to the auxiliary shaft, a rear shaft, means for transmitting power from the driving shaft to the rear shaft, speed change gears for transmitting power from the auxiliary shaft to the rear shaft, a centrifugal governor having one end attached to the rear shaft, a grooved drum attached to the opposite end of the centrifugal governor and being adapted to slide along the rear shaft, a sliding contact lever having one end in sliding contact in the groove of the grooved drum and the other end adapted to describe a portion of a circle, a plurality of electric circuits including a source of electric energy, means for shifting the speed change gears including shifting bars and levers, electro-magnets included in the electric circuits, the cores of the electro-magnets being attached to the gear shifting levers, a clutch lever, the core of at least one electro-magnet attached to the clutch lever, an electric switch board located near the centrifugal governor, the terminals of the electric circuits being located on the switch board, electric circuit closers attached to the sliding contact lever for closing the electric circuits leading to the terminals when the sliding contact lever passes over the terminals, the circuit closers being electrically insulated from the sliding contact lever and from each other, the electro-magnets being arranged in pairs for the speed change gear levers and singly for the clutch lever, the center point of the terminals for the electric circuits leading to the clutch lever electro-magnet being off center or in a different radius from the center point of the terminals for the electric circuits leading to the speed change gear electro-magnets, the said radius being the radius of that porton of a circle described by the sliding contact lever, the terminals being grouped so that when the sliding contact lever is over the center point of the terminals of the clutch circuit the circuit closers are not in contact with the terminals of the speed change gear circuits, and conversely, when the sliding contact lever is over the center point of the terminals of the speed change gear circuits the circuit closers are not in contact with the terminals of the clutch circuit, but when the sliding contact lever is off center of the terminals and in a radius between the centers of the terminals for the clutch circuit and the centers of the terminals for the speed change gear circuits, then the clutch circuit is closed by one of the circuit closers and at least one of the speed change gear circuits is closed by another of the circuit closers substantially as shown.

In testimony whereof we have hereunto set our hands in the presence of two subscribing witnesses.

HERBERT S. DILLON.
MYER C. GASS.

Witnesses:
 GLENN GASS,
 W. W. HEALEY.